United States Patent
Denison et al.

(10) Patent No.: US 7,753,005 B2
(45) Date of Patent: *Jul. 13, 2010

(54) LIVESTOCK BLOW DRYER WITH REMOVABLE CARTRIDGE MOTORS

(75) Inventors: Howard G. Denison, Keatchie, LA (US); Henry M. Craig, III, Bossier City, LA (US)

(73) Assignee: Boss Technology Systems, Inc., Bossier City, LA (US)

( * ) Notice: Subject to any disclaimer, the term of this patent is extended or adjusted under 35 U.S.C. 154(b) by 60 days.

This patent is subject to a terminal disclaimer.

(21) Appl. No.: 11/756,694

(22) Filed: Jun. 1, 2007

(65) Prior Publication Data

US 2008/0006217 A1  Jan. 10, 2008

Related U.S. Application Data

(60) Provisional application No. 60/818,600, filed on Jul. 5, 2006.

(51) Int. Cl.
*A01K 13/00* (2006.01)
*F26B 13/00* (2006.01)

(52) U.S. Cl. .......................... 119/606; 119/600; 34/523

(58) Field of Classification Search ................ 119/600, 119/606, 609; 34/97, 100, 219, 96, 201, 34/212, 222, 523
See application file for complete search history.

(56) References Cited

U.S. PATENT DOCUMENTS

| | | | |
|---|---|---|---|
| 19,726 A | 3/1858 | Troccoli | |
| 1,255,662 A | 2/1918 | Sullivan | |
| 1,564,896 A | 12/1925 | Truman | |
| 2,420,251 A | 5/1947 | La Foriyes | |
| 2,496,232 A | 1/1950 | Potter | |
| 3,837,581 A | 9/1974 | Orsoff | |
| 4,135,080 A | 1/1979 | Wells, Jr. | |
| 4,232,454 A | 11/1980 | Springer | |
| 4,977,690 A * | 12/1990 | Davis, Jr. | ................... 34/523 |
| 5,444,215 A | 8/1995 | Bauer | |
| 5,507,103 A | 4/1996 | Merritt | |
| 5,513,598 A * | 5/1996 | Zapparoli | ................... 119/600 |
| 5,813,088 A | 9/1998 | Wagner et al. | |

(Continued)

OTHER PUBLICATIONS

Air Force Blaster motorcycle Dryer Product web page (www.motorcycledryer.com), date unknown, 3 pages.

(Continued)

*Primary Examiner*—Michael R Mansen
*Assistant Examiner*—Monica Williams
(74) *Attorney, Agent, or Firm*—Meyertons, Hood, Kivlin, Kowert & Goetzel, P.C.; Eric B. Meyertons

(57) ABSTRACT

A blower system for livestock may include a housing. An air inlet may be located on the housing. A cartridge assembly may be mounted in the housing. One or more fans may be mounted to the cartridge assembly. The fans may intake air through the air inlet and expel air through an air outlet located on the housing. One or more motors may be mounted to the cartridge assembly and coupled to the fans. The cartridge assembly may be removed from the housing with the fans and motors mounted to the cartridge assembly. The blower system may be portable. The blower system may allow a user to apply the air from the air outlet to livestock.

20 Claims, 8 Drawing Sheets

U.S. PATENT DOCUMENTS

| | | | |
|---|---|---|---|
| 5,926,972 | A | 7/1999 | Di Peso |
| 6,011,903 | A | 1/2000 | Nosenchuck |
| 6,055,938 | A | 5/2000 | Klein |
| 6,148,537 | A | 11/2000 | Altamore |
| 6,205,674 | B1 | 3/2001 | Kaizuka |
| 6,212,790 | B1 | 4/2001 | Stetson |
| 6,286,228 | B1 * | 9/2001 | Bodnar et al. ............ 34/61 |
| 6,305,325 | B1 | 10/2001 | Sullivan |
| 6,367,162 | B2 | 4/2002 | Fukumoto et al. |
| 6,798,982 | B2 | 9/2004 | Ryu et al. |
| 6,826,850 | B2 | 12/2004 | Jewell |
| 2004/0168337 | A1 | 9/2004 | Curtin |
| 2008/0006215 | A1 | 1/2008 | Denison et al. |
| 2008/0006216 | A1 | 1/2008 | Denison et al. |
| 2008/0006218 | A1 | 1/2008 | Denison et al. |
| 2008/0006219 | A1 | 1/2008 | Denison et al. |
| 2008/0006220 | A1 | 1/2008 | Denison et al. |
| 2008/0006221 | A1 | 1/2008 | Denison et al. |
| 2008/0006222 | A1 | 1/2008 | Denison et al. |

OTHER PUBLICATIONS

Jeffers Livestock Challengair™ 2000 EV product web page (www.jefferslivestock.com), date unknown, 1 page.

Jeffers Livestock Circuiteer product web page (www.jefferslivestock.com), date unknown, 1 page.

Office Communication for U.S. Appl. No. 11/756,711 mailed Feb. 17, 2009 (available in USPTO PAIR).

Office Communication for U.S. Appl. No. 11/756,688 mailed Mar. 4, 2009 (available in USPTO PAIR).

Office Communication for U.S. Appl. No. 11/756,691 mailed Apr. 1, 2009 (available in USPTO PAIR).

Office Communication for U.S. Appl. No. 11/756,696 mailed Mar. 2, 2009 (available in USPTO PAIR).

Office Communication for U.S. Appl. No. 11/756,701 mailed Mar. 17, 2009 (available in USPTO PAIR).

Office Communication for U.S. Appl. No. 11/756,704 mailed Mar. 30, 2009 (available in USPTO PAIR).

Office Communication for U.S. Appl. No. 11/756,688 mailed Sep. 16, 2009 (available in USPTO PAIR).

Office Communication for U.S. Appl. No. 11/756,688 mailed Oct. 15, 2009 (available in USPTO PAIR).

Office Communication for U.S. Appl. No. 11/756,691 mailed Sep. 16, 2009 (available in USPTO PAIR).

Office Communication for U.S. Appl. No. 11/756,691 mailed Oct. 15, 2009 (available in USPTO PAIR).

Office Communication for U.S. Appl. No. 11/756,696 mailed Sep. 23, 2009 (available in USPTO PAIR).

Office Communication for U.S. Appl. No. 11/756,701 mailed Sep. 23, 2009 (available in USPTO PAIR).

Office Communication for U.S. Appl. No. 11/756,704 mailed Sep. 17, 2009 (available in USPTO PAIR).

Office Communication for U.S. Appl. No. 11/756,704 mailed Oct. 15, 2009 (available in USPTO PAIR).

Office Communication for U.S. Appl. No. 11/756,708 mailed Apr. 2, 2010 (available in USPTO PAIR).

Office Communication for U.S. Appl. No. 11/756,711 mailed Sep. 1, 2009 (available in USPTO PAIR).

Office Communication for U.S. Appl. No. 11/756,711 mailed Oct. 5, 2009 (available in USPTO PAIR).

Office Communication for U.S. Appl. No. 11/756,688 mailed Apr. 26, 2010 (available in USPTO PAIR).

Office Communication for U.S. Appl. No. 11/756,691 mailed Apr. 21, 2010 (available in USPTO PAIR).

Office Communication for U.S. Appl. No. 11/756,696 mailed May 10, 2010 (available in USPTO PAIR).

Office Communication for U.S. Appl. No. 11/756,701 mailed May 13, 2010 (available in USPTO PAIR).

Office Communication for U.S. Appl. No. 11/756,711 mailed Apr. 28, 2010 (available in USPTO PAIR).

* cited by examiner

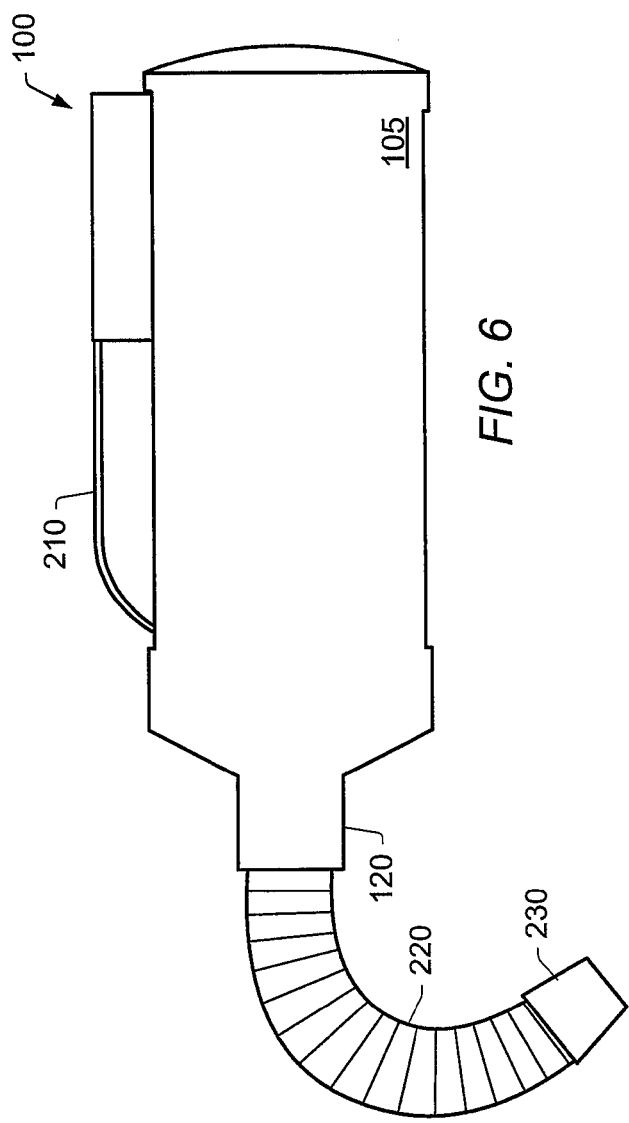
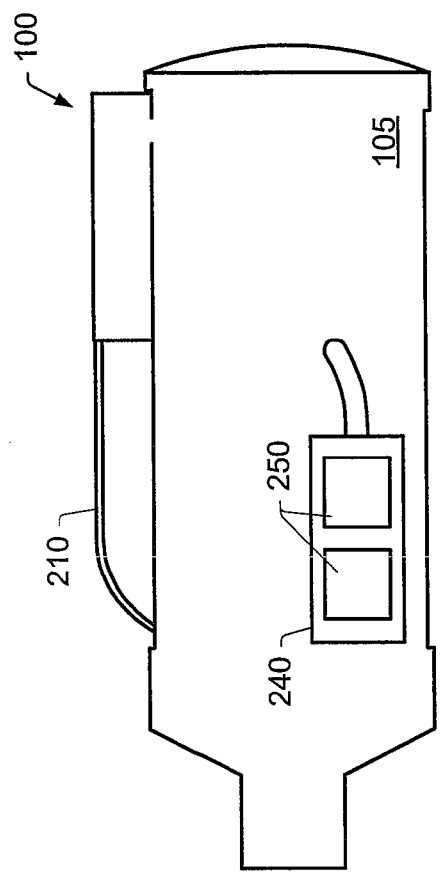

LIVESTOCK BLOW DRYER WITH REMOVABLE CARTRIDGE MOTORS

PRIORITY CLAIM

This patent application claims priority to U.S. Provisional Patent No. 60/818,600 entitled "SYSTEMS AND METHODS FOR APPLYING AIR TO LIVESTOCK" to Denison et al. filed on Jul. 5, 2006.

BACKGROUND

1. Field of the Invention

The present invention relates to blower systems and methods of use. More particularly, the invention relates to the applying of air to livestock using the blower systems.

2. Description of Related Art

The appearance of livestock is important for displaying livestock at events such as shows, sales, and/or auctions. Livestock are often washed and dried before such events so that the livestock present the best possible appearance at an event. Presenting a good appearance at the event increases the value of the livestock.

Blow drying livestock prior to these events may be beneficial. Blow drying livestock may make livestock hair appear more voluminous and shiny. Blow dryers for humans are easy to use and maneuver but have long drying times and require livestock to stay calm and still for long periods. Currently available commercial models may be large, cumbersome, difficult to maneuver around the livestock, and not easily portable. Blow dryers for livestock also have to be durable as the livestock environment may be rugged and harsh.

SUMMARY

In various embodiments, a blower system applies air to livestock. The blower system may include air inlets, air outlets, filter systems, fans, motors, and/or insulating regions. Air inlets, air outlets, filter systems, fans, and/or motors may be at least partially positioned in a housing. The blower system may be efficient at providing air (e.g., heated air) to livestock to dry the hair of the livestock. The blower system may be portable so that a user may lift and carry the blower system and/or move the blower system around the livestock.

In some embodiments, air outlets may have a smaller or approximately equal cross-sectional area as the cross-sectional area of air inlets. Air inlets and/or air outlets may be coupled to one or more filter systems. Filter systems may include filters and/or mufflers. Fans may draw air into one or more air inlets and expel air from air outlets. Motors may actuate the fans.

In some embodiments, the motors and/or fans are mounted in a cartridge assembly. The cartridge assembly may be removed from the housing with the fans and motors mounted to the cartridge assembly.

In some embodiments, the flow of air in the blower system may turn at least approximately 90 degrees prior to passing one of the fans. One or more deflectors in the blower system may cause the air to be deflected and turn at least approximately 90 degrees from the flow of air from the air inlet. Turning and/or deflecting air streams in a blower system may increase the velocity at which the air stream flows.

In some embodiments, a valve is coupled to the air outlet and the air inlet. The valve may recirculate at least some air back into the air inlet. The valve may selectively control the amount of air exiting the blower system and recirculating back into the blower system.

In some embodiments, a hollow plate is coupled to the air outlet. The hollow plate may include a plurality of holes to allow air to exit the plate at a variety of angles and at pressures sufficient to create a whirlpool effect in a volume of water. In some embodiments, a nozzle is coupled to the air outlet. The nozzle may have a wide, narrow slit opening for air to exit the nozzle.

In some embodiments, the blower system may be portable. The blower system may be lightweight. The blower system may include straps, legs, wheels, and/or carts.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which:

FIG. 6 depicts an embodiment of a blower system with an attachment.

FIG. 7 depicts an embodiment of a blower system with an external electrical supply box.

Figure 1:
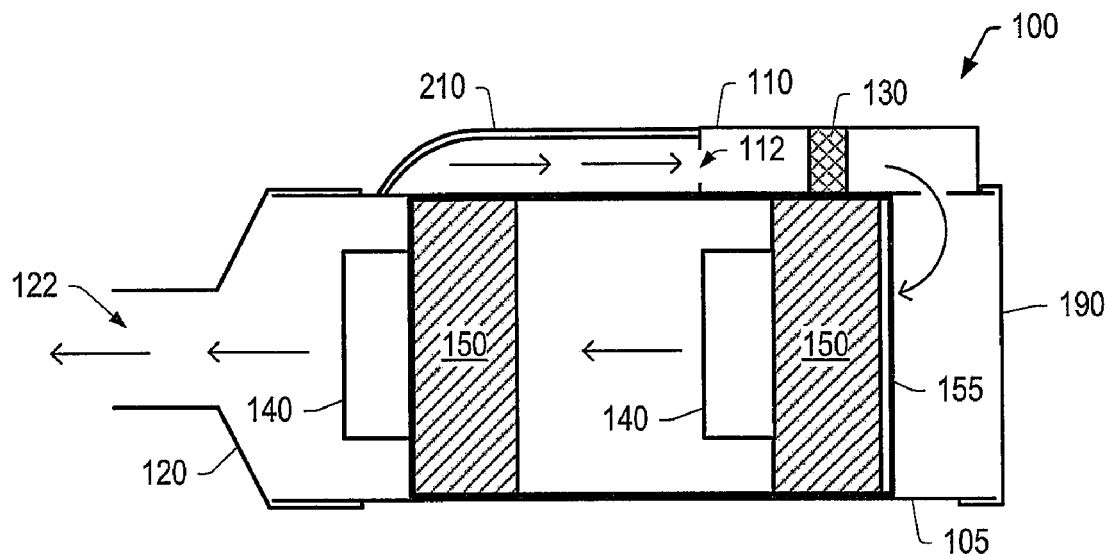
FIG. 1 depicts a cross-sectional representation of an embodiment of a blower system.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF EMBODIMENTS

In various embodiments, a blower system may apply air to livestock (e.g., cattle or horses). Air from the blower system applied to livestock may accelerate the evaporation of water on livestock and dry the hair of the livestock. In certain embodiments, the air applied from the blower system to livestock fluffs and/or gives livestock an appearance of more hair (e.g., add volume to the hair of the livestock). Air applied from the blower system may add shine or sheen to livestock hair. Use of the blower system may improve livestock appearance during display, sale, and/or auction.

Figure 2:
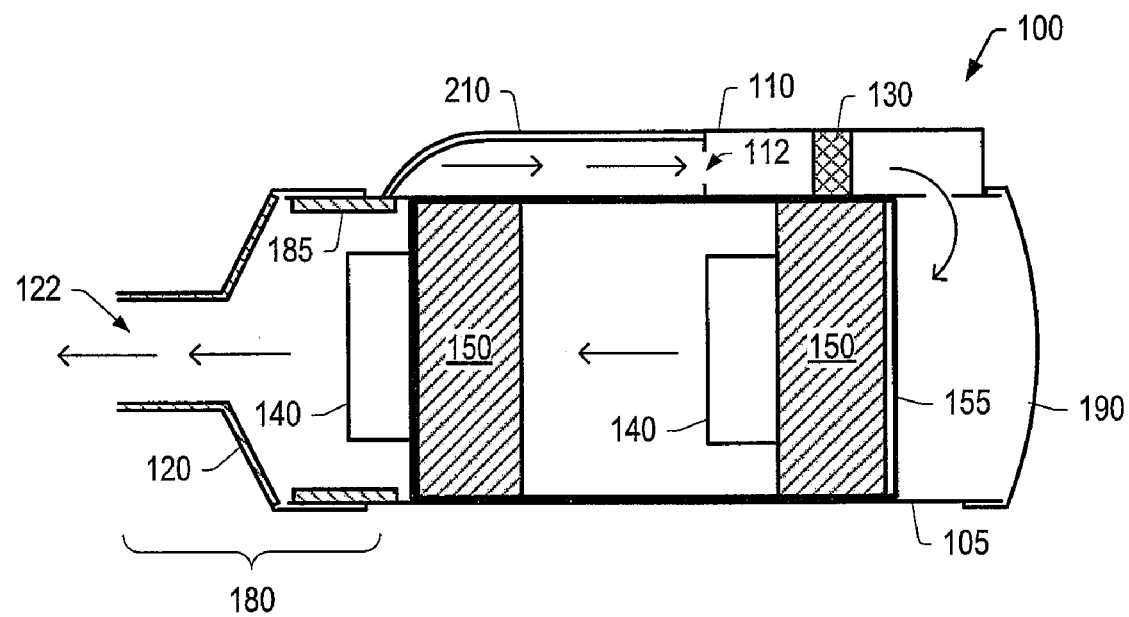
FIG. 2 depicts a cross-sectional representation of an embodiment of a blower system with insulating material.

FIGS. 1-2 depict cross-sectional representations of embodiments of blower system 100. In certain embodiments, blower system 100 includes one or more air inlets 110, air outlets 120, filter systems 130, motors 140, and/or fans 150. In some embodiments, blower system 100 (including air inlets 110, air outlets 120, filter systems 130, motors 140, and/or fans 150) is placed in housing 105. Air inlets 110 and/or air outlets 120 may be formed as part of housing 105. Filter systems 130, motors 140, and/or fans 150 may be positioned in housing 105. Housing 105 may at least partially contain the filter systems, motors, and/or fans of the blower system.

Housing 105 may include metals, plastics, or any combination thereof. In certain embodiments, housing 105 is at least partially formed of stainless steel. In certain embodiments, housing 105 is at least partially formed of aluminum or aluminum alloys. Aluminum or aluminum alloys may be used because they are lightweight, sturdy, and economical. Aluminum or aluminum alloys may also resonate less sound from housing 105 than other materials.

In certain embodiments, air enters blower system 100 through air inlet 110 and is expelled via air outlet 120. Air inlet 110 may include opening 112. Opening 122 may have any cross-sectional shape desired including, but not limited to, circular, rectangular, square, and triangular. In certain embodiments, opening 112 has a semicircular cross-sectional shape.

Air outlet 120 may be a nozzle or other projection for directing or focusing air towards livestock and/or out of housing 105. Air outlet 120 may be conically shaped, frustoconically shaped, circularly shaped, or any combination thereof. In certain embodiments, air outlet 120 is a frustoconically shaped nozzle. Air outlet 120 has opening 122 to allow air to exit through the air outlet. In certain embodiments, air outlet 120 is a cap (e.g., an end cap) that is removable and/or replaceable on an end of housing 105. Air outlet 120 may be secured to an end of housing 105 using fasteners (e.g., screws or bolts). A gasket or other sealing device may be used to inhibit air leakage between air outlet 120 and the end of housing 105.

In certain embodiments, a cross-sectional area of opening 122 is smaller than or approximately the same as a cross-sectional area of opening 112. The air outlet opening 122 cross-sectional area being smaller than the air inlet opening 112 cross-sectional area may increase the pressure or velocity of air expelled from the air outlet. Increasing the pressure or velocity of air expelled from the blower system may reduce livestock drying times and/or increase volume added to livestock hair. In certain embodiments, the cross-sectional area of opening 122 is at least 30%, at least 50%, at least 60%, at least 75%, at least 90%, or at least 95% of the cross-sectional area of opening 112. The cross-sectional shapes of opening 112 and/or opening 122 may be substantially circular, substantially oval, substantially rectangular, substantially oblong, substantially square, irregular, and/or any combination thereof. In some embodiments, air inlet 110 and/or air outlet 120 include more than one opening.

In certain embodiments, air inlet 110 is located distal or away from ends of housing 105. For example, air inlet 110 may be proximate a center of housing 105. In certain embodiments, air inlet 110 is positioned on an upper portion of housing 105 (e.g., a portion of the housing that is away from the ground when the housing is placed on the ground). Positioning the air inlet away from the ground and/or at a portion distal from the end of the housing may reduce the amount of dust or other particles entering blower system 100. Dust and other particles may foul blower system 100. For example, dust and other particles may block or clog motors, fans, filtering systems, air inlets, and/or air outlets.

In certain embodiments, blower system 100 includes filter system 130. Filter system 130 may be coupled to air inlet 110 and/or air outlet 120. In certain embodiments, filter system 130 includes a filter and/or a muffler. Filter system 130 may inhibit passage of particles through blower system 100. In certain embodiments, filter system 130 inhibits particles greater than a predetermined size from passing through the blower system. Filtering particles may inhibit or reduce the potential for damage to the blower system. Particles may foul and/or damage the blower system. In certain embodiments, filter system 130 includes fiberglass, paper, plastics, metals such as stainless steel or aluminum, and/or other materials. In some embodiments, filter system 130 includes a fine mesh material. In some embodiments, filter system includes multilayer filters. In one embodiment, filter system 130 includes a High Efficiency Particulate Air filter (a "HEPA filter").

In certain embodiments, filter system 130 includes one or more mufflers. The mufflers may reduce or inhibit sound from exiting the blower system and/or reduce the sound of operating the blower system. In certain embodiments, sound waves may be dampened, absorbed, and/or destroyed by the muffler. In certain embodiments, the muffler includes baffles that reduce sound emitted from the blower system. In some embodiments, filter system 130 may be designed so that opposite moving sound waves are likely to collide and cancel each other out. For example, a resonating chamber may be used in filter system 130.

In certain embodiments, blower system 100 includes fans 150. Fans 150 are positioned in housing 105. During operation of blower system 100, air may be drawn in through air inlet 110 and expelled through air outlet 120. Fans 150 may produce or assist in producing a flow of air through blower system 100. Fans 150 may increase the velocity of air passing through the fan. Motors 140 may be coupled to fans 150 to actuate the fans. Fans 150 may compress or pressurize air as it passes through the fans. Compressing the air may increase the temperature of the air passing through the fan. In certain embodiments, operation of the fans and the motors may produce heat. This produced heat may heat the air inside housing 105.

In some embodiments, fans 150 may operate in series (a volume of air passes through the fans sequentially) and/or in parallel (portions of the volume of air passes through two or more fans substantially simultaneously). Fans 150 may have any shape or size. Fans 150 may have a plurality of blades that cause flow of air.

Fans 150 may be actuated by motors 140. In certain embodiments, two or more motors 140 are used to actuate fans 150 (e.g., one motor may be coupled to each fan). Motors 140 may be electrically connected in series and/or in parallel. In certain embodiments, motors 140 are thru-flow discharge motors. For example, motors 140 may be Ametek® Lamb Electric (Kent, Ohio) model no. 115923 motors.

Figure 3:
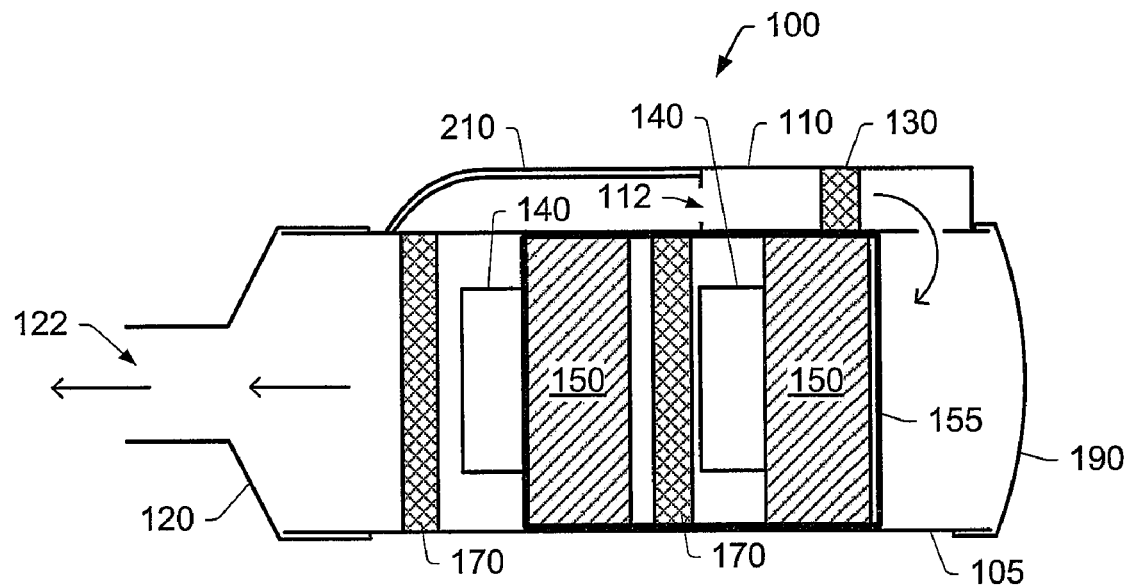
FIG. 3 depicts a cross-sectional representation of an embodiment of a blower system with heaters.

In certain embodiments, motor 140 and fan 150 are coupled so that the motor and fan are removable as a single unit (e.g., a single blower unit), as depicted in FIGS. 1-3. The motor and fan may be removed or replaced as the single blower unit from housing 105. In some embodiments, the motor and the fan are coupled so that the motor and the fan are uncoupled and removed individually.

Figure 8:
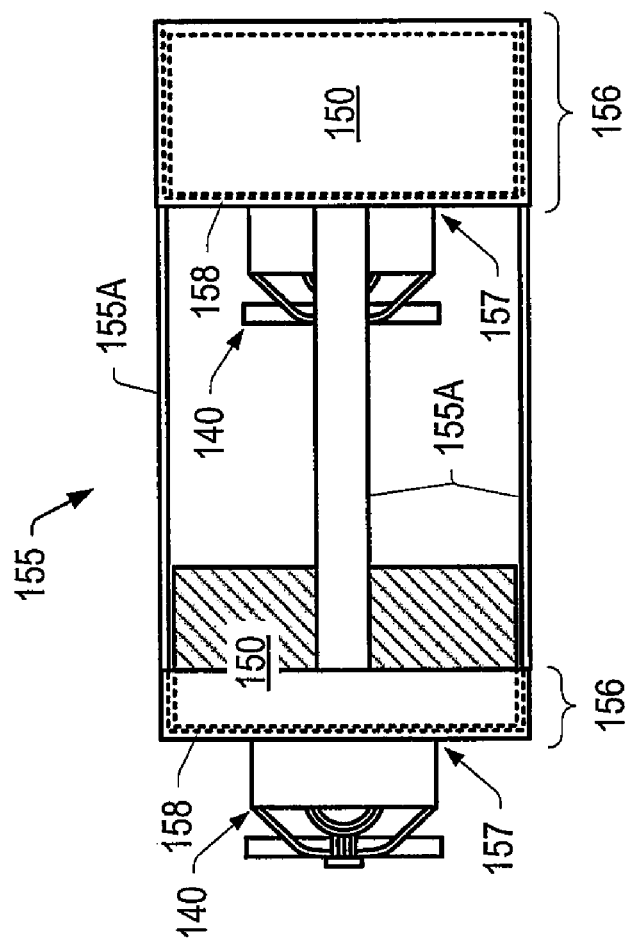
FIG. 8 depicts a side view of an embodiment of a cartridge assembly with motors and fans coupled to the cartridge assembly.

In certain embodiments, fans 150 and motors 140 are coupled to (e.g., mounted in) cartridge assembly 155. FIG. 8 depicts a side view of an embodiment of cartridge assembly 155 with motors 140 and fans 150 coupled to the cartridge assembly. Fans 150 and motors 140 may be coupled to cartridge assembly 155 as single units. Cartridge assembly 155 may be designed to couple to any number of single units of fans 150 and motors 140. In one embodiment, two single units of fans 150 and motors 140 are coupled to cartridge assembly 155 (e.g., two fans with two motors are coupled in the cartridge assembly). In some embodiments, fans 150 and motors 140 are coupled to cartridge assembly separately.

Cartridge assembly 155 may have one or more seating sections 156 to allow fans 150 and motors 140 to be seated in the cartridge assembly. Bars 155A or other connectors may couple together seating sections 156 of cartridge assembly 155. In certain embodiments, bars 155A are welded or brazed to seating sections 156 to couple together the seating sections.

Figure 9:
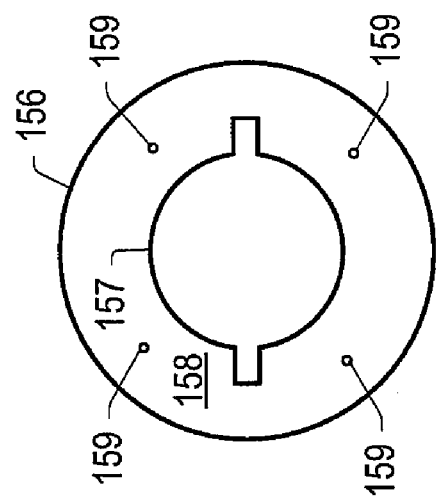
FIG. 9 depicts an end view of an embodiment of a seating section of a cartridge assembly.

FIG. 9 depicts an end view of an embodiment of seating section 156. Seating section 156 may have opening 157. Opening 157 may be sized so that motor 140 passes through the opening and fan 150 seats against wall 158 of seating section 156 surrounding the opening. Fan 150 and motor 140 may be coupled to (e.g., mounted to) seating section 156 of cartridge assembly 155 by fastening the fan and the motor to the seating section. For example, screws or other fasteners may mount the fan and the motor to the cartridge assembly using openings 159, depicted in FIG. 9. Cartridge assembly 155 may have other openings and or passages for allowing wiring associated with fans 150 and motors 140 to pass through or out of the cartridge assembly.

Fan 150 and/or motor 140 may seat against the walls of cartridge assembly 155 so that little or no air leaks around the fan and the motor. Inhibiting air leaks around the fan and the motor inhibits air recirculation in cartridge assembly 155. Air recirculation in cartridge assembly 155 may cause a reduction in velocity or power of air exiting the blower system.

Cartridge assembly 155, with motors 140 and fans 150 coupled to the cartridge assembly, may be mounted in housing 105, as shown in FIGS. 1-3. In certain embodiments, cartridge assembly 155 is placed in housing 105 and secured in the housing screws or other fasteners. For example, cartridge assembly 155 may slide into housing 105 through an open end of the housing. Cartridge assembly 155 may be fastened to the housing screws coupled to the walls of the housing. In certain embodiments, deflector 190 and/or air outlet 120 are removable end caps placed on housing 105. Deflector 190 and/or air outlet 120 may be removed to allow cartridge assembly 155 to be inserted and/or removed from housing 105.

In certain embodiments, a sealing material is used to create a seal between the outer walls of cartridge assembly 155 and the inside walls of housing 105. In certain embodiments, a gasket or o-ring creates a seal between the cartridge assembly and the housing. The gasket may be, for example, a silicone gasket. In some embodiments, a silicone bead or a bead of another suitable material is placed between the outer walls of cartridge assembly 155 and the inside walls of housing 105 to create a seal. The seal between the outer walls of cartridge assembly 155 and the inside walls of housing 105 inhibits air recirculation inside the housing. Air recirculation inside housing 105 may cause a reduction in velocity or power of air exiting the blower system.

The seal may be broken to remove cartridge assembly 155 from housing 105. Upon re-insertion of the cartridge assembly or insertion of a new cartridge assembly, a new seal may be made between the newly inserted cartridge assembly and housing 105.

Mounting motors 140 and fans 150 in housing 105 using cartridge assembly 155 allows simple removal and/or replacement of the motors and the fans. For example, cartridge assembly 155 may be removed from housing 105 and a new cartridge assembly placed in the housing with one or more new motors and/or fans coupled to the new cartridge assembly. As another example, motors and/or fans on the removed cartridge assembly 155 may be replaced with new motors and/or fans and the cartridge assembly may be placed back in the housing.

Motors and/or fans may be more susceptible to failure (e.g., burning out) than other components of the blower system. Being able to remove, repair, and/or replace the motors and/or fans using the cartridge assembly increases the operational life of the blower system. In addition, the cartridge assembly may decrease downtime for repair or maintenance of the blower system. For example, the cartridge assembly allows a user of the blower system to replace motors and/or fans in the field or at a work location instead of having to transport the blower system to a workshop, distributor, or manufacturer for repair.

In some embodiments, blower system 100 includes insulated region 180, as depicted in FIG. 2. Insulated region 180 may include materials that thermally insulate at least a portion of housing 105 and/or air outlet 120 to inhibit heat loss from the housing and/or the air outlet. Insulated region 180 may at least partially retain heat within the insulated region and/or housing 105. Heat retained by in insulated region 180 may at least partially transfer to air in or proximate the insulated region. In some embodiments, insulated region 180 includes materials that act as a muffler and reduce sound emitted from the blower system. In certain embodiments, insulated region 180 includes portions of housing 105 surrounding fans 150 and/or motors 140.

In certain embodiments, insulated region 180 includes coating 185. Coating 185 may be placed on an inside wall of housing 105 and/or air outlet 120. Coating 185 may retain heat within the housing and/or the air outlet. Coating 185 may be formed of an insulating material. For example, coating 185 may include natural materials, synthetic materials, or combinations thereof. Coating 185 may include petrochemical products or byproducts. Coating 185 may include plastic and/or metal. Coating 185 may include fibers such as wool, cellulose, fiberglass, and/or synthetic fibers (such as plastic fibers or recycled plastic fibers). In certain embodiments, coating 185 includes ceramic material. Coating 185 may retain heat to facilitate heat transfer to air proximate the insulating material.

In certain embodiments, insulated region 180 reduces or eliminates the need for a heater within the blower system. Heat retained by insulated region 180 may sufficiently heat air proximate the insulated region so that additional heat (e.g., heat from a heater) is not necessary. In certain embodiments, insulated region 180 allows air in the blower system to increase in temperature by about 15° F. to about 85° F. above ambient temperature (e.g., the temperature of air entering the blower system). In some embodiments, insulated region 180 allows air to increase in temperature by at least about 25° F. In some embodiments, insulated region 180 allows air in the blower system to increase in temperature by about 30° F. to about 50° F. above ambient temperature. For example, insulated region 180 may allow air entering the blower system at 70° F. to be heated to at least 115° F. or, in some embodiments, to at least 155° F., without using heaters. Increasing the temperature of air exiting the blower system may reduce drying times for livestock.

In some embodiments, blower system 100 includes one or more heaters 170. FIG. 3 depicts a cross-sectional representation of an embodiment of blower system 100 with heaters 170. Heaters 170 may increase the temperature of air passing through blower system 100. In some embodiments, heaters 170 are used to increase the temperature of air to temperatures above a temperature increase due to heat from motors 140 and/or fans 150. Heaters 170 may be any device capable of transferring heat to surrounding air, such as, but not limited to, conventional heat exchangers or heating coils.

In some embodiments, the direction of flow of air in housing 105 turns within the housing. In certain embodiments, the direction of flow of air from the air inlet may turn at least about 90 degrees, at least about 180 degrees, or at least about 270 degrees prior to passing through fans 150. Turning and/or deflecting the air may increase the velocity with which the flow of air travels through housing 105. Increasing the velocity of air in housing 105 may increase the velocity and/or power of air output from air outlet 120.

In certain embodiments, housing 105 includes deflector 190. At least a portion of deflector 190 may be curved, angular, or planar. FIG. 1 depicts an embodiment of a planar deflector 190. FIGS. 2 and 3 depict embodiments with curved deflectors 190. Deflector 190 may be positioned at or proximate an end of housing 105. In certain embodiments, deflector 190 is a cap (e.g., an end cap) coupled to an end of housing 105. Deflector 190 may be secured to an end of housing 105 using screws or other fasteners. A gasket or other sealing device may be used to inhibit air leakage between deflector 190 and the end of housing 105. In some embodiments, deflector 190 is integrated in the housing and/or a portion of the housing (e.g., the deflector is formed or manufactured as a part of the housing).

As an air stream enters the blower system via air inlet 110, at least a portion of the air contacts deflector 190. Deflector 190 may deflect the flow of air towards a front end of housing 105 (e.g., towards air outlet 120). In some embodiments, deflector 190 redirects the flow of air at an angle of at least approximately 90 degrees, at least approximately 180 degrees, or at least approximately 270 degrees from the direction of the flow of air from the air inlet. For example, the air stream entering the housing may at least partially follows a path similar to a "U" or "L" in the housing between the air inlet and the air outlet.

Figure 4:
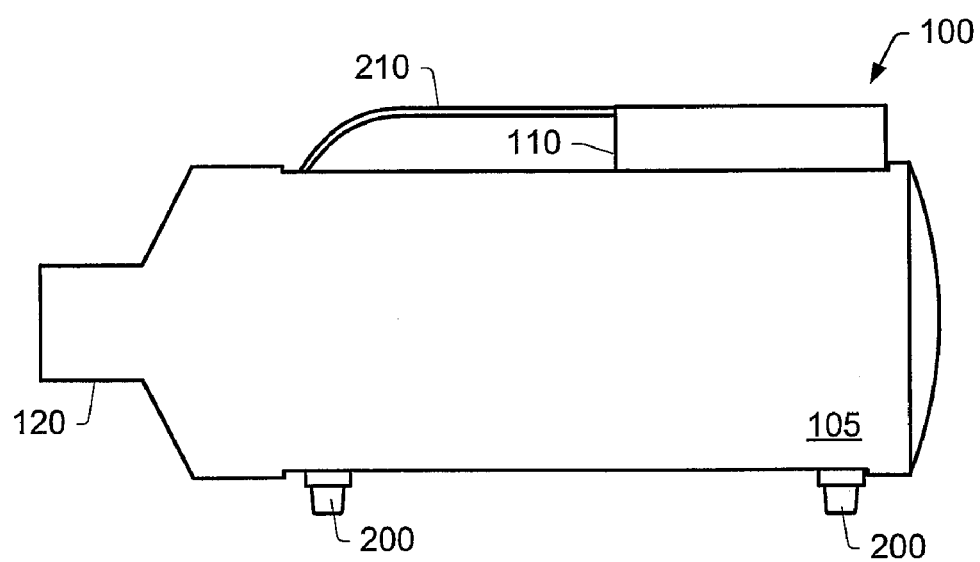
FIG. 4 depicts an embodiment of a blower system with legs.

In some embodiments, blower system 100 may be portable. Blower system 100 may be made of lightweight materials. Blower system 100 may have a weight that allows a user to lift and/or carry the blower system. In some embodiments, legs and/or wheels may be coupled to the housing of the blower system. FIG. 4 depicts an embodiment of blower system 100 with legs 200 coupled to the housing 105. In certain embodiments, legs 200 are wheels to allow rolling of the blower system. Legs 200 may be positioned proximate a center of housing 105 or at an end of the housing. In certain embodiments, housing 105 includes handle 210. Handle 210 may allow a user to lift and/or carry housing 105. Handle 210 may be placed on housing 105 so that the housing is balanced when the user lifts and/or carries the housing the handle.

In certain embodiments, blower system 100 may include a cart. Housing 105 may be positioned in or on the cart. The cart may include two or more wheels or four or more wheels to facilitate transport of the blower system. The cart may be at least partially formed of metal, plastic, or a combination thereof. The cart may include lightweight materials.

Figure 5A:
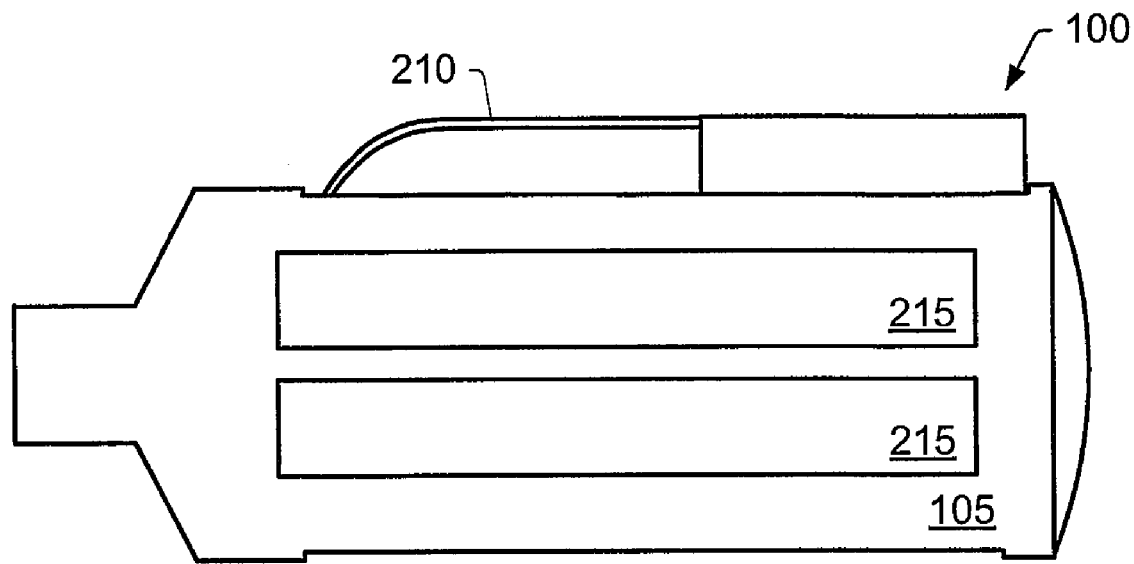
FIGS. 5A-B depict embodiments of blower systems with straps.
Figure 5B:
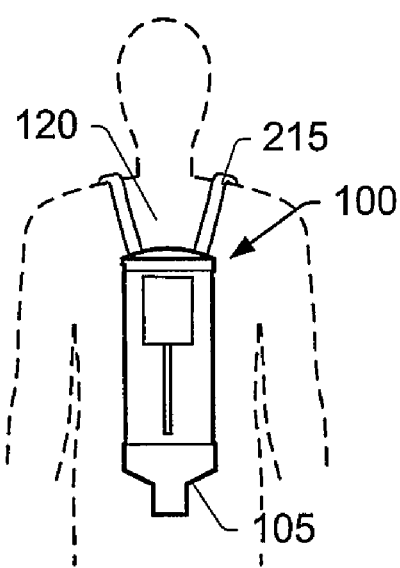

In some embodiments, straps 215 may be coupled to housing 105, as depicted in FIG. 5A. Straps 215 may be flexible or inflexible. Straps 215 may be formed of plastic, metal, fabric, and/or a variety of other materials. In certain embodiments, straps 215 are formed of the same material as at least a portion of the housing. In some embodiments, straps 215 are detachable from the housing. A user may be able to lift and/or carry housing 105 using straps 215. Straps 215 may be positioned on housing 105 so that the user may carry the housing like a backpack, as depicted in FIG. 5B. Straps 215 may be adjustable to allow users of varying sizes to carry housing 105. During use, the user may carry the housing on his/her back to facilitate movement in and around livestock while drying the livestock.

In certain embodiments, blower system 100 includes attachments that may be coupled to air outlet 120. Attachments include, but are not limited to, a valve, a hose, a nozzle, a diffuser, an ionizer, or a brush. In one embodiment, an ionizer is coupled to air outlet 120 to add shine to livestock hair. FIG. 6 depicts an embodiment of blower system 100 with hose 220 and nozzle 230 coupled to air outlet 120.

Figure 14:
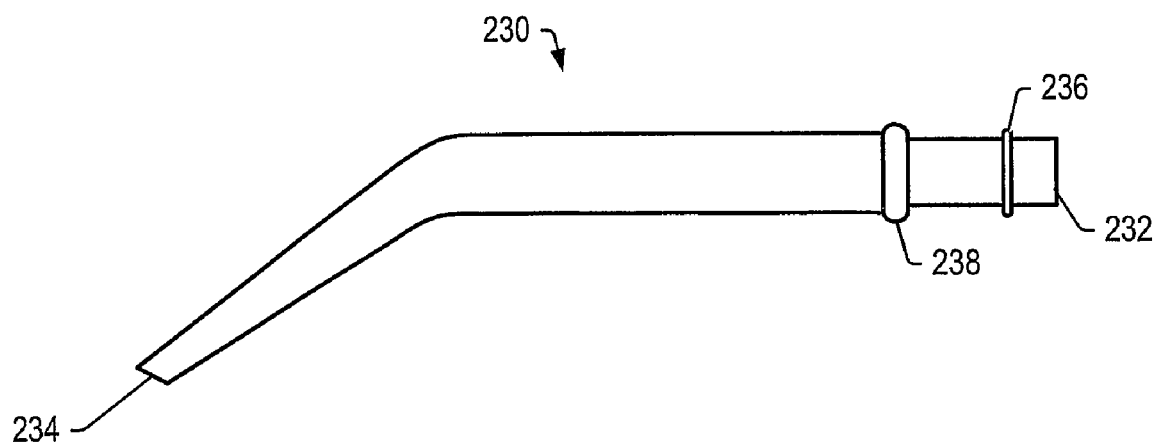
FIG. 14 depicts a side view of an embodiment of a nozzle.
Figure 15:
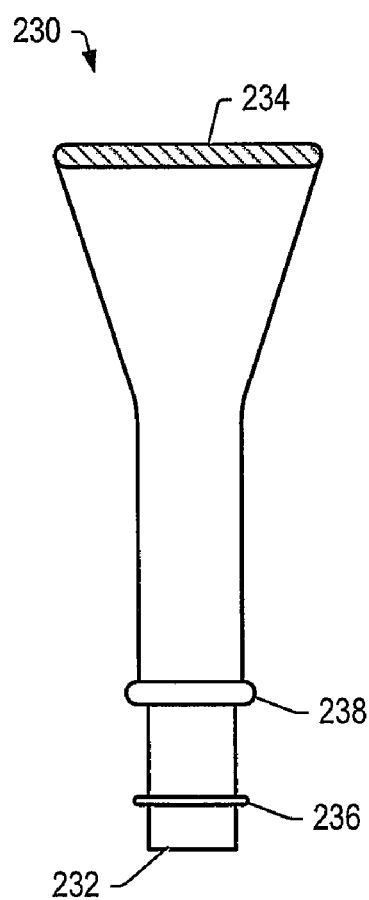
FIG. 15 depicts a top view of an embodiment of a nozzle.

FIGS. 14 and 15 depict an embodiment of nozzle 230. Nozzle 230 may be coupled to hose 220 (depicted in FIG. 6) or attached directly to air outlet 120 (depicted in FIG. 6). As depicted in FIGS. 14 and 15, nozzle 230 includes inlet opening 232 and exit opening 234. Nozzle 230 may be made from molded plastic or other lightweight, strong materials that minimize weight for the operator and inhibit injury to animals or livestock from use of the nozzle. Inlet opening 232 is shaped and/or sized to couple to hose 220 and/or air outlet 120 (depicted in FIG. 6). In certain embodiments, inlet opening 232 fits inside the opening of hose 220 and/or air outlet 120. O-ring 236 provides an air-tight seal around inlet opening 232 so that air does not leak between the inlet opening and the opening of hose 220 or air outlet 120. Stop 238 may be placed on nozzle 230 to set an insertion length for the nozzle into hose 220 or air outlet 120.

Exit opening 234 on nozzle 230 may have a shape and/or size that provides certain properties for treating livestock and/or other animals. For example, nozzle 230 may be shaped and/or sized to wipe off water or other liquids from the livestock's body as it is moved along the surface of the livestock (e.g., along the fur of the livestock). The livestock's body may be wiped by the combination of the physical wiping using nozzle 230 (and exit opening 234) and the flow of air (e.g., warm or hot air) through the nozzle. The flow of air (e.g., warm air) through nozzle 230 may also provide an air massage (e.g., a warm air massage) to the animal as the nozzle is moved along the livestock's body surface.

In certain embodiments, exit opening 234 on nozzle 230 is a wide, narrow slit opening, as depicted in FIGS. 14 and 15. In one embodiment, exit opening 234 is a 3/8" height opening with a width of about 3.5" to about 5". The width of exit opening 234 provides a larger grooming surface for treating the livestock. Exit opening 234 with a shape as depicted in FIGS. 14 and 15 may be easier to control while grooming the livestock than a conical shaped exit opening. In some embodiments, nozzle 230 is a bent or angled nozzle. The bend or angle in nozzle 230 may make the nozzle more ergonomic (easier to use and control) for the operator or groomer of the livestock.

Figure 12:
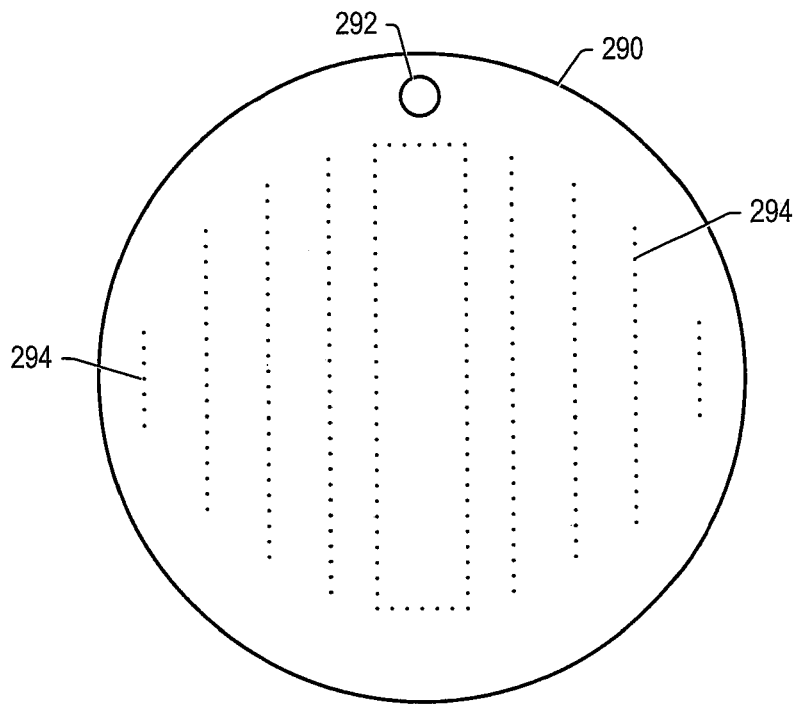
FIG. 12 depicts a top view of an embodiment of a plate.
Figure 13:
FIG. 13 depicts a side view of an embodiment of a plate.

FIGS. 12 and 13 depict an embodiment of plate 290 that may be attached to a blower system. Plate 290 may be a hollow plate. In certain embodiments, plate 290 is made of aluminum or other lightweight material. In some embodiments, plate 290 is coated with a non-corrosive material such as a spray-on coating (e.g., sprayed on polyurethane such as those used in truck bed liners). Opening 292 may be used to couple plate 290 to hose 220 (depicted in FIG. 6) and/or air outlet 120 (depicted in FIG. 6). Opening 292 allows air to enter into plate 290. Air exits plate 290 through exit holes 294. Plate 290 may include a plurality of holes 294. High pressure air introduced into plate 290 from the blower system exits through holes 294. Air exiting holes 294 may be at a high velocity and high pressure. Holes 294 may direct air at a variety of angles so that air escapes plate 290 at various angles.

In certain embodiments, plate 290 is placed in a volume of water (e.g., a tub or pool filled with water). Plate 290 may be placed at or near the bottom of the volume of water. High velocity air exiting plate 290 may create a whirlpool effect in the volume of water. The whirlpool of water may be used for hydrotherapy treatment of livestock (e.g., horses or cattle). For example, the whirlpool of water may aid in healing and/or treating cattle or horse leg injuries such as muscles soreness, muscle tears, tendonitis, and bone chips. The water may be hot, warm, and/or cold water depending on a desired use of the water (e.g., cold water may be used to reduce soreness in livestock muscles and hot or warm water may be used for relaxing livestock). In some embodiments, the blower system provides heated air through plate 290. The heated air may assist in heating the volume of water and/or maintaining the water temperature at warm or hot temperatures for longer periods of time.

Figure 11:
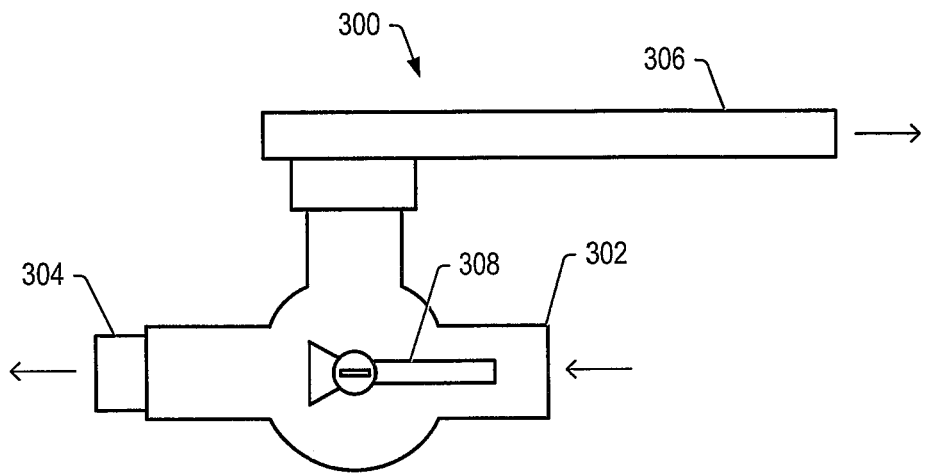
FIG. 11 depicts an embodiment of a valve.

In some embodiments, a valve is coupled to air outlet 120, depicted in FIG. 6. The valve may be used to control and/or direct the flow of air exiting air outlet 120. FIG. 11 depicts an embodiment of valve 300 that may be coupled to air outlet 120 (depicted in FIGS. 1-4, and 6). Valve 300 may be used to control the flow of air (e.g., the flow rate of air through the valve) and/or redirect flow back into the blower system. Valve 300 is made of materials that can withstand high air temperatures such as aluminum or high temperature plastics. Air inlet 302 is coupled to air outlet 120 of blower system 100 (depicted in FIGS. 1-4, and 6). Air outlet 304 provides an exit for air from valve 300. Air outlet 304 may be coupled to attachments described herein (e.g., plate 290 depicted in FIGS. 12 and 13). Attachments include, but are not limited to, a valve, a hose, a nozzle, a diffuser, an ionizer, or a brush.

In certain embodiments, valve 300 includes bypass section 306. Bypass section 306 is coupled to air inlet 110 of blower system 100 (depicted in FIGS. 1-4). Air entering valve 300 exits the valve through either air outlet 304 or bypass section 306. The amount of air exiting valve 300 through air outlet 304 and bypass section 306 is controlled by handle 308. Air exiting valve 300 may be controlled so that a selected amount of air (between 0% and 100%) exits through air outlet 304 and the balance of the air exits through bypass section 306. Thus, air exiting valve 300 is controlled between fully open and fully closed flow for both air outlet 304 and bypass section 306.

In certain embodiments, handle 308 is operated to divert all or some of the air to bypass section 306 and back into the blower system (e.g., back into air inlet 110, depicted in FIGS. 1-4). Diverting air back into the blower system instead of through air outlet 304 recirculates air into the blower system. Recirculating air into the blower system heats the air faster and/or to higher temperatures above ambient because air is continually heated in the system (e.g., air entering the blower system includes heated air so that heat is added to the inlet and further heating in the blower system adds more heat to the air). Heating the air faster and/or to higher temperatures above ambient may be useful in colder climates where the ambient air temperature is low. Higher air temperatures may be more soothing and/or more comfortable for the livestock.

After the air has been heated to a desired temperature by recirculating the air, handle 308 may be operated to allow air (or more air) to exit through air outlet 304. For example, after the air is heated to the desired temperature, air for heating or grooming livestock may be provided through air outlet 304.

In some embodiments, at least some air is continually recirculated to maintain desired air temperatures of air exiting air outlet 304 (e.g., exiting the blower system).

In some embodiments, the amount of air exiting air outlet 304 is controlled to provide a selected amount of air output from the blower system. For example, the amount of air exiting air outlet 304 may be controlled to limit the pressure of air exiting the system so that livestock or animals are not spooked or bothered. In certain embodiments, air outlet 304 is coupled to plate 290 (depicted in FIGS. 12 and 13). The amount of air exiting air outlet 304 may be controlled to control the whirlpool effect created by plate 290. The whirlpool effect may need to be limited so that the livestock or animal is not spooked or bothered by the whirlpool of water (e.g., the amount of turbulence in the whirlpool effect is not so large as to frighten the livestock or animal).

FIG. 7 depicts an embodiment of blower system 100 with electrical supply box 240. Electrical supply box 240 may be located externally on housing 105. Locating electrical supply box 240 externally may protect and/or insulate the supply box from heat generated in housing 105. In some embodiments, electrical supply box 240 is vibrationally isolated from housing 105. For example, a damper or cushion may vibrationally isolate electrical supply box 240 from housing 105. Vibrationally isolating electrical supply box 240 may reduce or inhibit vibrations from housing 105 being transferred to components inside the electrical supply box.

Electrical supply box 240 may include relays, switches, power supplies, rechargeable batteries, and/or external outlets 250 for connecting other devices to the supply box. Motors 140, depicted in FIGS. 1-3, may be coupled to electrical supply box 240 using, for example, wires. Electrical supply box 240 may provide power to the motors. In some embodiments, wires from the motors are removably coupled to wires from electrical supply box 240 (e.g., the wires may be coupled using twist-on wire connectors such as WIRE-NUT® connectors). Removably coupling the wires allows the wires to be uncoupled for removing the motors and/or the fans from the blower system.

Figure 10:
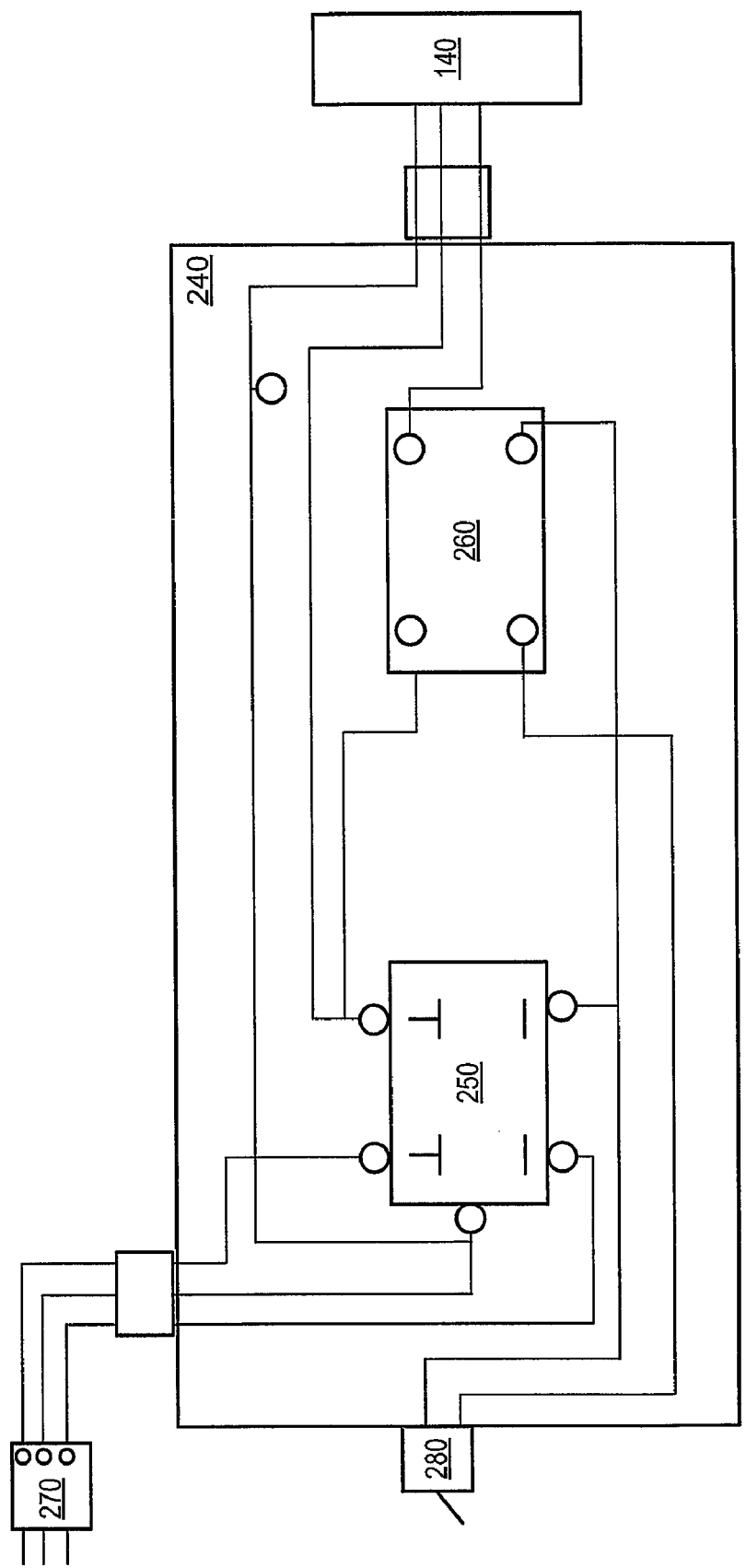
FIG. 10 depicts an embodiment of a wiring diagram for an electrical supply box.

FIG. 10 depicts an embodiment of a wiring diagram for electrical supply box 240. Motors 140 are coupled to relay 260. Relay 260 is coupled to power source 270 and switch 280 to provide controllable power to motors 140. Power source 270 may be an AC or other suitable power source for operating motors 140. Relay 260 may be a solid state relay or other relay capable of operating at high powers required for motors 140. Relay 260 operates to turn on/off power to motors 140. Switch 280 is coupled to relay 260 to operate (e.g., open and close) the relay and turn on/off power to motors 140. Switch 280 may be, for example, a mechanical switch such as a toggle switch.

In certain embodiments, motors 140, relay 260, power source 270, and switch 280 are coupled so that power to the motors goes through the relay and not through the switch. Routing power through relay 260 shields switch 280 from the high power associated with operating motors 140. A solid state relay may be more reliable than a mechanical relay or switch at the powers required to operate motors 140. Thus, using relay 260 to turn on/off power to motors 140 may increase the lifetime of blower system 100.

It is to be understood the invention is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "an attachment" includes a combination of two or more attachments and reference to "a material" includes mixtures of materials.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A blower system for livestock, comprising:
a housing comprising:
an air inlet located on the housing;
an air outlet located on the housing, wherein the air outlet is configured to route air to livestock for grooming;
an opening in an exterior of the housing, wherein the opening is of sufficient size to enable a removable cartridge disposed in an interior of the housing to be removed from the interior of the housing via sliding of the cartridge assembly along an interior surface of the housing and through the opening; and
a removable cover configured to couple to the housing to cover the opening during use; and
the removable cartridge assembly mounted in the interior of the housing, wherein the removable cartridge assembly comprises one or more fans assemblies, and
wherein one or more of the fan assemblies comprise:
one or more fans mounted to the removable cartridge assembly, the fans being configured to intake air through the air inlet and expel air through the air outlet located on the housing; and
one or more motors mounted to the cartridge assembly and coupled to the fans;
wherein the removable cartridge assembly is configured to be removed from the interior of the housing via sliding of the removable cartridge assembly along an interior surface of the housing and through the opening with the one or more fans and the one or more motors mounted to the cartridge assembly.

2. The blower system of claim 1, wherein the cartridge assembly is mounted in the housing so such that air in the housing is inhibited from recirculating.

3. The blower system of claim 1, wherein the cartridge assembly is sealed in the housing to inhibit air recirculation in the housing.

4. The blower system of claim 1, wherein the cartridge assembly, the fans, and the motors are configured to removed from the housing as a single unit.

5. The blower system of claim 1, wherein at least one of the motors is configured to actuate at least one of the fans.

6. The blower system of claim 1, further comprising a filter system coupled to the air inlet.

7. The blower system of claim 1, wherein the air is heated inside the housing during use.

8. The blower system of claim 1, wherein the air is pressurized inside the housing during use.

9. The blower system of claim 1, wherein the housing comprises aluminum.

10. The blower system of claim 1 wherein the housing comprises a cylindrical housing,
wherein the air outlet comprises an air outlet at a first end of the cylindrical housing,
wherein the opening comprises a circular opening at a second end of the cylindrical housing opposite the first end of the housing,
wherein the removable cover comprises a solid removable end cap configured to be removably secured over the circular opening at the second end of the housing during use, such that air does not enter or exit the housing via the opening during use.

11. The blower system of claim 10, wherein the removable cartridge assembly is configured to be disposed in the housing, during use, wherein the removable cartridge assembly comprises:
a cartridge frame; and
two or more fans assemblies removably coupled to the cartridge assembly frame, wherein, during use, the two or more fan assemblies are arranged in series with respect to one another along a longitudinal axis of the cylindrical housing; and
wherein the removable cartridge assembly is configured to be slid along the longitudinal axis of the cylindrical housing and through the circular opening at a second end of the cylindrical housing, such that the removable cartridge frame and the two or more fan assemblies are removed from the housing as a single unit.

12. The blower system of claim 1, wherein the removable cartridge assembly is configured to be disposed in the housing, during use, wherein the removable cartridge assembly comprises:
a cartridge frame; and
two or more fans assemblies removably coupled to the cartridge assembly frame, wherein, during use, the two or more fan assemblies are arranged in series with respect to one another along a longitudinal axis of the housing; and
wherein the removable cartridge assembly is configured to slide along the longitudinal axis of the housing and through the an opening at an end of the housing, such that the removable cartridge frame and the two or more fan assemblies are slid into and out of the an interior of the housing as a single unit.

13. The blower system of claim 1, wherein the removable cover is coupled to the housing via screws.

14. The blower system of claim 1, wherein the removable cartridge assembly is coupled to the housing via screws.

15. The blower system of claim 1, wherein the removable cover is solid such that the removable cover is configured to block air flow from entering or exiting the housing via the opening when the cover is installed over the opening during use.

16. The blower system of claim 1, wherein the removable cover comprises the air outlet.

17. The blower system of claim 1, wherein the removable cartridge assembly comprises a rigid frame having fan assembly seating section spaced apart from one another along a longitudinal axis of the rigid frame, such that the rigid frame is configured to position the one or more fan assemblies in series relative to one another when the fan assemblies are disposed in the seating sections during use.

18. The blower system of claim 1, wherein removable cartridge assembly comprises a cartridge frame comprising:

a rigid elongate member comprising a first end and a second end;
a first seating section coupled to the first end of the rigid elongate member, wherein a first fan assembly is seated in the first seating section during use; and
a second seating section coupled to the second end of the rigid elongate member, wherein a second fan assembly is seated in the second seating section during use, such that the first and the second fan assemblies are arranged in series along a longitudinal axis of the cartridge frame such that substantially all of the air expelled by the first fan assembly is subsequently drawn in by the second fan assembly during use.

19. A blower system for livestock, comprising:
a cylindrical housing, comprising:
an air inlet;
an air outlet at a first end of the cylindrical housing, wherein the air outlet is configured to route air to livestock for grooming; and
a circular opening at a second end of the cylindrical housing opposite the first end of the housing, wherein the circular opening is of sufficient size and shape to enable a removable cartridge assembly disposed in an interior of the housing to be removed from the interior of the housing via sliding of the cartridge assembly along a longitudinal axis of the cylindrical housing through the opening;
a removable end cap configured to be removably secured over the circular opening at the second end of the housing during use, wherein the removable end cap is substantially solid such that the removable end cap is configured to block air flow from entering or exiting the housing via the opening when the cover is installed over the opening during use; and
a removable cartridge assembly disposed in the housing, during use, wherein the removable cartridge assembly comprises:
a cartridge frame; and
two or more fans assemblies removably coupled to the cartridge assembly frame, wherein, during use, the two or more fans are arranged in series with respect to one another along the longitudinal axis of the cylindrical housing; and
wherein the removable cartridge assembly is configured to be removed from the interior of the housing via sliding of the removable cartridge assembly along a longitudinal axis of the cylindrical housing through the opening at the second end of the cylindrical housing, such that the removable cartridge frame and the two or more fan assemblies are removed from the an interior of the housing as a single unit.

20. A method, comprising:
providing a livestock blower system, comprising:
a cylindrical housing, comprising:
an air inlet;
an air outlet at a first end of the cylindrical housing, wherein the air outlet is configured to route air to livestock for grooming; and
a circular opening at a second end of the cylindrical housing opposite the first end of the housing, wherein the circular opening is of sufficient size and shape to enable a removable cartridge assembly disposed in an interior of the housing to be removed from the interior of the housing via sliding of the cartridge assembly along a longitudinal axis of the cylindrical housing through the opening;
a removable end cap configured to be removably secured over the circular opening at the second end of the housing during use, wherein the removable end cap is substantially solid such that the removable end cap is configured to block air flow from entering or exiting the housing via the opening when the cover is installed over the opening during use; and
a removable cartridge assembly disposed in the housing, during use, wherein the removable cartridge assembly comprises:
a cartridge frame; and
two or more fans assemblies removably coupled to the cartridge assembly frame, wherein, during use, the two or more fans are arranged in series with respect to one another along the longitudinal axis of the cylindrical housing; and
wherein the removable cartridge assembly is configured to be removed from the interior of the housing via sliding of the removable cartridge assembly along a longitudinal axis of the cylindrical housing through the opening at the second end of the cylindrical housing, such that the removable cartridge frame and the two or more fan assemblies are removed from the an interior of the housing as a single unit;
removing the removable end cap from the housing;
sliding the removable cartridge assembly from the interior of the housing via the opening for performing maintenance on one or more of the fan assemblies removably coupled to the cartridge assembly frame;
installing the removable cartridge assembly into the interior of the housing via the circular opening; and
reinstalling the removable end cap to the housing such that air does not enter or exit the housing via the opening during use.

* * * * *